(12) United States Patent
Sakthivel et al.

(10) Patent No.: US 10,533,790 B2
(45) Date of Patent: Jan. 14, 2020

(54) SINGLE SERVE BEVERAGE DISPENSER FOR AN APPLIANCE

(71) Applicant: Haier US Appliance Solutions, Inc., Wilmington, DE (US)

(72) Inventors: Dhinesh Babu Sakthivel, Hyderabad (IN); Aditya Kampalli, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 322 days.

(21) Appl. No.: 15/487,492

(22) Filed: Apr. 14, 2017

(65) Prior Publication Data
US 2018/0299190 A1    Oct. 18, 2018

(51) Int. Cl.
| F25D 23/12 | (2006.01) |
| B67D 1/00 | (2006.01) |
| B67D 1/08 | (2006.01) |
| A47J 31/40 | (2006.01) |
| B67B 7/00 | (2006.01) |

(52) U.S. Cl.
CPC .......... *F25D 23/126* (2013.01); *A47J 31/407* (2013.01); *B67D 1/004* (2013.01); *B67D 1/0888* (2013.01); *B67B 7/24* (2013.01); *B67D 1/0895* (2013.01); *B67D 2210/00036* (2013.01)

(58) Field of Classification Search
CPC ...... A47J 31/02; A47J 31/446; A47J 31/0678; A47J 31/0673; A47J 31/0668; A47J 31/4471; A47J 31/3604; A47J 31/3638; A47J 31/3628; A47J 31/3676
USPC ................................ 99/289 R, 295
See application file for complete search history.

(56) References Cited

U.S. PATENT DOCUMENTS

| 5,430,515 A * | 7/1995 | Lawther ................. G03B 17/02 396/360 |
| 5,440,978 A * | 8/1995 | O'Brien ................ B30B 9/3032 100/229 A |
| 5,477,295 A * | 12/1995 | Lawther ................. G03B 17/02 396/516 |
| 6,857,353 B2 | 2/2005 | Kollep et al. |
| 9,307,858 B2 | 4/2016 | Zhang et al. |
| 2006/0123998 A1 * | 6/2006 | Castellani ........... A47J 31/0673 99/495 |

(Continued)

FOREIGN PATENT DOCUMENTS

| WO | WO2009118177 A1 | 10/2009 |
| WO | WO2016126991 A1 | 8/2016 |

*Primary Examiner* — Serkan Akar
*Assistant Examiner* — Spencer H. Kirkwood
(74) *Attorney, Agent, or Firm* — Dority & Manning, P.A.

(57) ABSTRACT

A single serve beverage dispenser having a beverage dispensing assembly for an appliance is provided. The beverage dispensing assembly may include a brewing body, a lid, an actuating lever, and a lift frame. The brewing body may define a brew chamber and define an outlet. The lid may be pivotally attached to the brewing body to rotate between a first position and a second position. The lid may include a cam and defining an inlet to receive a flow of water in the first position. The actuating lever may extend between a first end and a second end. The first end may be slidably engaged with the cam to move between the first position and the second position. The lift frame may be pivotally attached to the lever at the second end to selectively motivate the brew pod away from the brew chamber in the second position.

16 Claims, 9 Drawing Sheets

(56) References Cited

U.S. PATENT DOCUMENTS

2016/0205988 A1* 7/2016 Bird .......................... A23L 2/56

* cited by examiner

SINGLE SERVE BEVERAGE DISPENSER FOR AN APPLIANCE

FIELD OF THE INVENTION

The present subject matter relates generally to single serve beverage dispensers, and more particularly to single serve beverage dispenser for use in domestic appliances.

BACKGROUND OF THE INVENTION

Appliances, such as refrigerator appliances, can include a dispensing assembly for directing ice from an ice maker and/or liquid water to the dispensing assembly. A user can activate the dispensing assembly to direct a flow of ice or liquid water into a cup or other container positioned within the dispensing assembly. Liquid water directed to the dispensing assembly is generally chilled or provided at an ambient temperature. However, certain appliances, e.g., refrigerator appliances, also include features for dispensing heated liquid water that can be used to make hot beverages, such as coffee or tea.

Conventional brew modules include a brew chamber that holds a brew pod therein. A lower needle may be positioned in the bottom of the brew chamber and a stationary upper needle may extend from a lid which is pivotally attached to the brew module. Each needle defines holes through which liquid may flow. Closing the lid causes the lid to push down the brew pod while upper and lower needles to pierce the top and bottom of the brew pod, respectively, such that water may flow through the brew pod to create the beverage which is dispensed to the user.

In conventional systems, difficulties may arise when trying to remove a brew pod from the brew chamber. For instance, after the lid has pushed the brew module further into the brew chamber, it can be difficult for a user to reach or access the brew pod. In some such systems, only a small portion of a lip or rim on the brew pod may be accessible. This may make removing a brew pod difficult, especially for those with limited dexterity. Moreover, if the lower needle has pierced the brew pod, a friction or interference fit may be formed between the lower needle and a bottom portion of the brew pod. The interference fit may restrict or hinder movement of the brew pod from the brew chamber, for instance, in a vertical direction.

Accordingly, a domestic appliance that includes improved features for dispensing single serve beverages would be useful. More specifically, single serve beverage dispensing assemblies for appliances that improve access to the brew pod would be useful. Specifically, single serve beverage dispensing assemblies that selectively motivate a brew pod out of an assembly would be particularly beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a beverage dispensing assembly is provided. The beverage dispensing assembly may include a brewing body, a lid, an actuating lever, and a lift frame. The brewing body may define a brew chamber to receive a brew pod, the brewing body defining an outlet. The lid may be pivotally attached to the brewing body to rotate between a first position and a second position. The first position may restrict access to the brew chamber. The second position may permit movement of the brew pod between the brew chamber. The lid may include a cam and defining an inlet to receive a flow of water in the first position. The actuating lever may extend between a first end and a second end. The first end may be slidably engaged with the cam to move between the first position and the second position. The lift frame may be pivotally attached to the lever at the second end to selectively motivate the brew pod away from the brew chamber in the second position.

In another aspect of the present disclosure, an appliance is provided. The appliance may include a cabinet defining an internal chamber, a door, a dispensing assembly, and a brew module. The door may be rotatably hinged to the cabinet to provide selective access to the internal chamber and define a dispenser recess. The dispensing assembly may be positioned within the dispenser recess and include a water delivery tube extending along a vertical direction. The brew module may be removably mounted to the dispensing assembly. Moreover, the brew module may include a brewing body, a lid, an actuating lever, and a lift frame. The brewing body may define a brew chamber to receive a brew pod, the brewing body defining an outlet. The lid may be pivotally attached to the brewing body to rotate between a first position and a second position. The first position may restrict access to the brew chamber. The second position may permit movement of the brew pod between the brew chamber. The lid may include a cam and defining an inlet to receive a flow of water in the first position. The actuating lever may extend between a first end and a second end. The first end may be slidably engaged with the cam to move between the first position and the second position. The lift frame may be pivotally attached to the lever at the second end to selectively motivate the brew pod away from the brew chamber in the second position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In some aspects of the present disclosure, an appliance including a beverage dispensing assembly is provided. The beverage dispensing assembly may include a brewing body to which a lid is pivotally attached. The brewing body may include a brew chamber that can be covered by the lid. A lift frame may be connected to the lid through an actuating lever. As the lid opens on the brewing body, the lifting frame may push a brew pod upward and away from the brew chamber.

Figure 1:
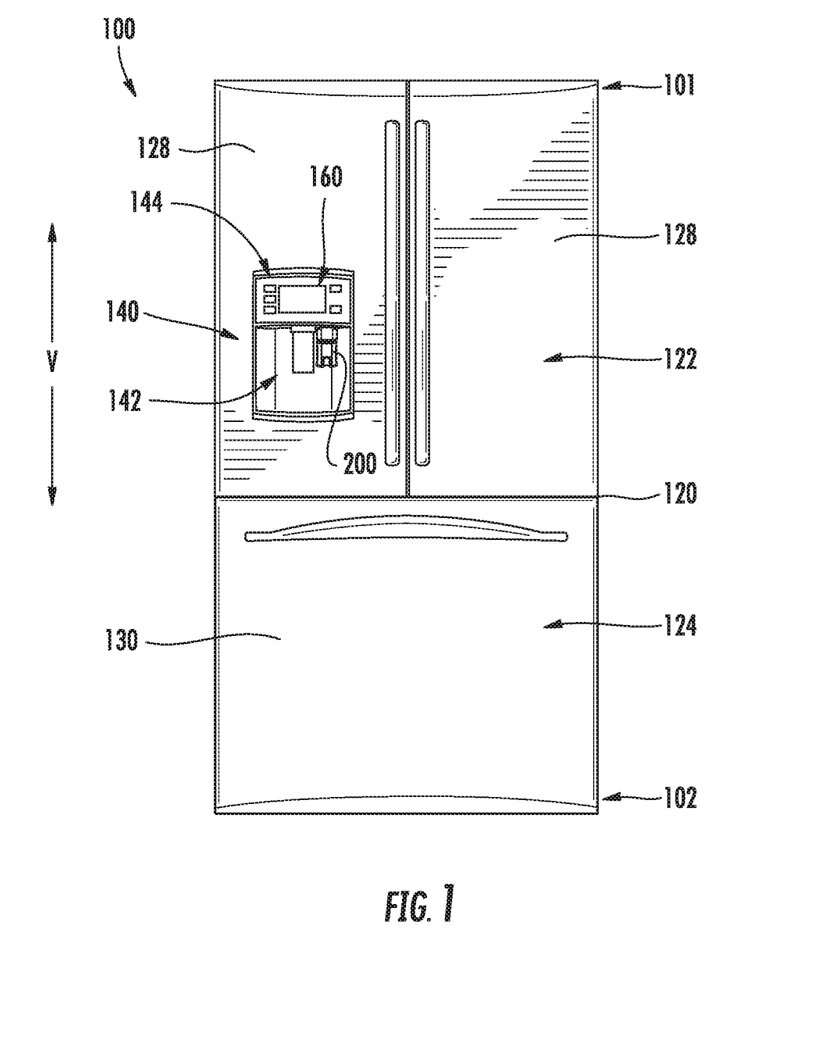
FIG. 1 provides a front, elevation view of a refrigerator appliance according to an example embodiment of the present disclosure.

Turning now to the figures, FIG. 1 provides a front, elevation view of a domestic appliance, according to an example embodiment of the present subject matter. Specifically, FIG. 1 illustrates a domestic appliance that is a refrigerator appliance 100. Refrigerator appliance 100 includes a cabinet or housing 120. Housing 120 extends between an upper portion 101 and a lower portion 102 along a vertical direction V. Housing 120 defines chilled chambers, e.g., a fresh food compartment 122 positioned adjacent upper portion 101 of housing 120 and a freezer compartment 124 arranged at lower portion 102 of housing 120. Housing 120 also defines a mechanical compartment (not shown) for receipt of a sealed cooling system for cooling fresh food compartment 122 and freezer compartment 124.

Refrigerator appliance 100 is generally referred to as a bottom-mount refrigerator appliance. However, it should be understood that refrigerator appliance 100 is provided by way of example only. Thus, the present subject matter is not limited to refrigerator appliance 100 and may be utilized in any suitable domestic appliance. For example, one of skill in the art will understand that the present subject matter may be used with side-by-side style refrigerator appliances or top-mount refrigerator appliances, as well as single-serve beverage appliances.

Refrigerator doors 128 are rotatably hinged to housing 120 proximate fresh food compartment 122 in order to permit selective access to fresh food compartment 122. A freezer door 130 is arranged below refrigerator doors 128 for accessing freezer compartment 124. Freezer door 130 is mounted to a freezer drawer (not shown) slidably coupled within freezer compartment 124.

Figure 2:
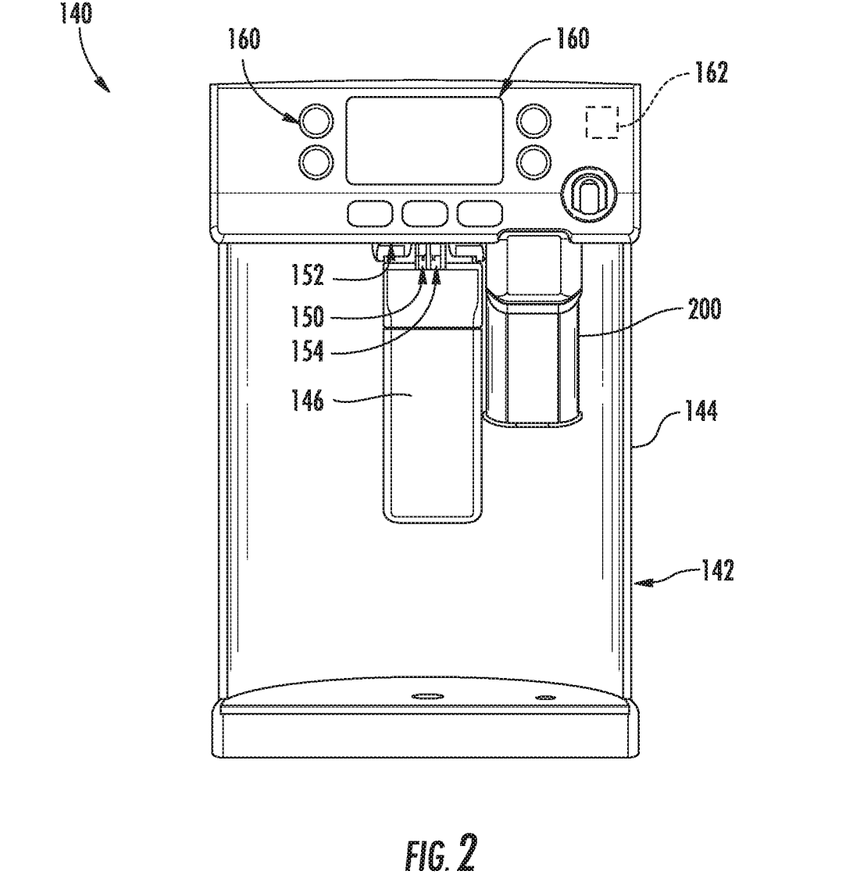
FIG. 2 provides a front, elevation view of a dispensing assembly of the example refrigerator appliance of FIG. 1.

As shown in FIGS. 1 and 2, refrigerator appliance 100 may also include a dispensing assembly 140 for dispensing various fluids, such as liquid water and/or ice, to a dispenser recess 142 defined on one of refrigerator doors 128. In some embodiments, dispensing assembly 140 includes a dispenser 144 positioned on an exterior portion of refrigerator appliance 100, for example, within dispenser recess 142. Dispenser 144 includes several outlets for accessing ice, chilled liquid water, and heated liquid water. In order to access ice, chilled liquid water, and heated liquid water; water-dispensing assembly 140 may, for example, include a paddle 146 mounted below a chilled water outlet 150, an ice outlet 152, and a heated water outlet 154.

During operation of dispensing assembly 140, a user may urge a vessel, such as a cup, against paddle 146 to initiate a flow of chilled liquid water, heated liquid water and/or ice into the vessel within dispenser recess 142. In particular, a control panel or user interface panel 160 may be provided for controlling the mode of operation of dispenser 144, e.g., for selecting chilled liquid water, heated liquid water, crushed ice, and/or whole ice. User interface panel 160 may include a chilled water dispensing button (not labeled), an ice-dispensing button (not labeled) and a heated water dispensing button (not labeled) for selecting between chilled liquid water, ice, and heated liquid water, respectively. User interface panel 160 may also include a display component, such as a digital or analog display device designed to provide operational feedback to the user.

Outlets 150, 152, 154 and paddle 146 may comprise an external part of dispenser 144 positioned at or adjacent dispenser recess 142, e.g., a concave portion defined in an outside surface of refrigerator door 128. Dispenser 144 is positioned at a predetermined elevation convenient for a user to access ice or liquid water, e.g., enabling the user to access ice without the need to bend-over and without the need to access freezer compartment 124. In the example embodiment, dispenser 144 is positioned at a level that approximates the chest level of a user.

Operation of the refrigerator appliance 100 can be regulated by a controller 162 that is operatively coupled to user interface panel 160 and/or various sensors as discussed below. User interface panel 160 provides selections for user manipulation of the operation of refrigerator appliance 100 such as e.g., selections between whole or crushed ice, chilled water, and other various options. In response to user manipulation of the user interface panel 160 or sensor signals, controller 162 may operate various components of the refrigerator appliance 100. Controller 162 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 162 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Controller 162 may be positioned in a variety of locations throughout refrigerator appliance 100. In the illustrated embodiment, controller 162 is located within the user interface panel 160. In other embodiments, the controller 162 is positioned at any suitable location within refrigerator appliance 100, such as for example within a fresh food chamber, a freezer door, etc. Input/output ("I/O") signals may be routed between controller 162 and various operational components of refrigerator appliance 100. For example, user interface panel 160 may be in communication with controller 162 via one or more signal lines or shared communication busses.

As illustrated, controller 162 may be in communication with the various components of dispensing assembly 160 and may control operation of the various components. For example, the various valves, switches, etc. may be actuatable based on commands from the controller 162. As discussed, interface panel 160 may additionally be in communication with the controller 162. Thus, the various operations may occur based on user input or automatically through controller 162 instruction.

In certain embodiments, refrigerator appliance 100 also includes features for generating heated liquid water and directing such heated liquid water to dispenser 144. Refrigerator appliance 100 need not be connected to a residential hot water heating system in order to supply heated liquid water to dispenser 144. Features of such a water heating assembly may be embodied by the disclosure of U.S. Pat. No. 9,254,058 (herein incorporated by reference) may include, for example, a variety of water supplies, hot water tanks, heating elements, temperature sensors, and control valves to heat water from a well or municipal water supply, store the heated water, and supply the heated water to dispenser 144.

Dispensing assembly 140 is optionally capable of providing heated water at various temperatures depending on the type of beverage being brewed. For example, when brewing ground coffee, water for brewing may be heated to between one hundred and eighty degrees Fahrenheit and one hundred and ninety degrees Fahrenheit. Additionally or alternatively, dispensing assembly 140 may be adjusted to provide water for making beverages at any suitable temperature.

Figure 11:
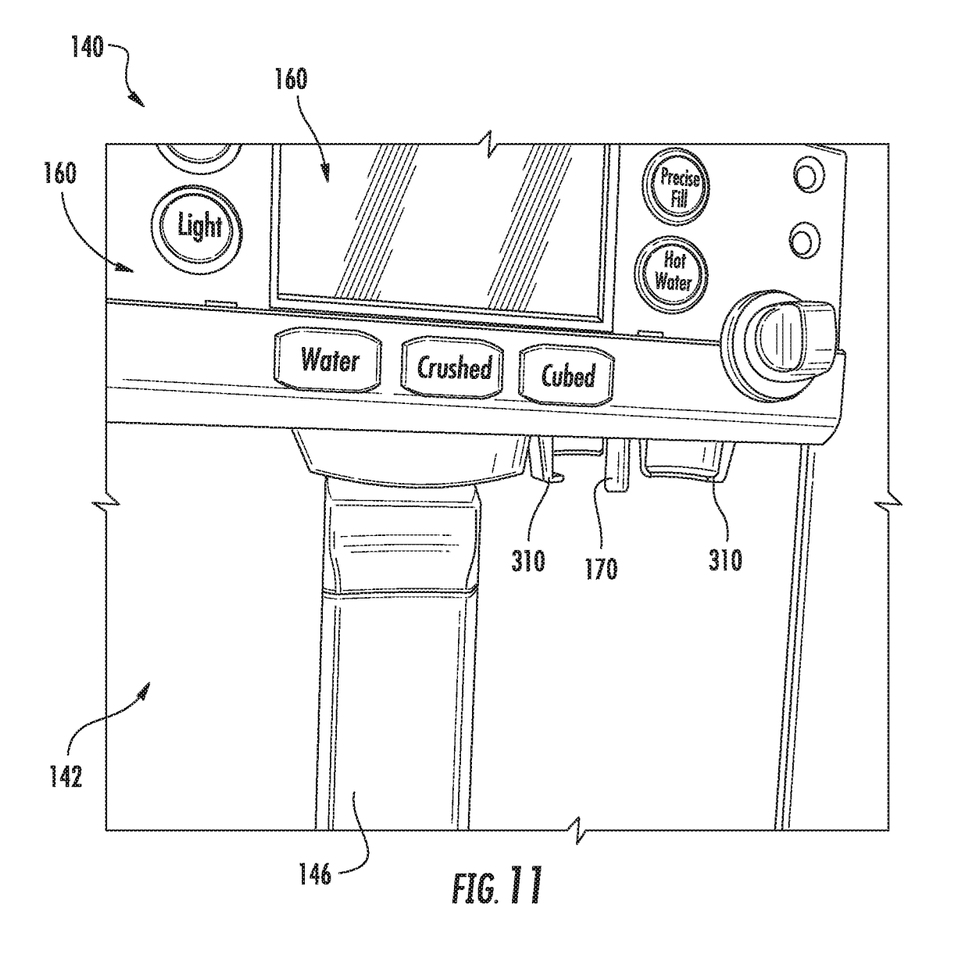
FIG. 11 provides a close-up view of an example dispensing assembly of FIG. 2.

As illustrated in FIG. 11, dispensing assembly 140 generally includes a water delivery tube 170 for supplying heated water from the water heating assembly to dispenser 144. For example, water delivery tube 170 may be embodied by a moving water delivery tube. Moving water delivery tube 170 may be any suitably rigid conduit or piping that is configured for moving in a substantially vertical direction V. More specifically, moving water delivery tube 170 may extend between a retracted position where it is retracted within dispenser 144 and an extended position where it protrudes downward along the vertical direction V away from dispenser 144. In an example embodiment, moving water delivery tube 170 is a vertically oriented stainless steel tube that extends into and provides heated water to a brew module 200. A drive assembly (not pictured), such as an electric drive motor and worm gear, may be provided, to move water delivery tube 170.

Figure 3:
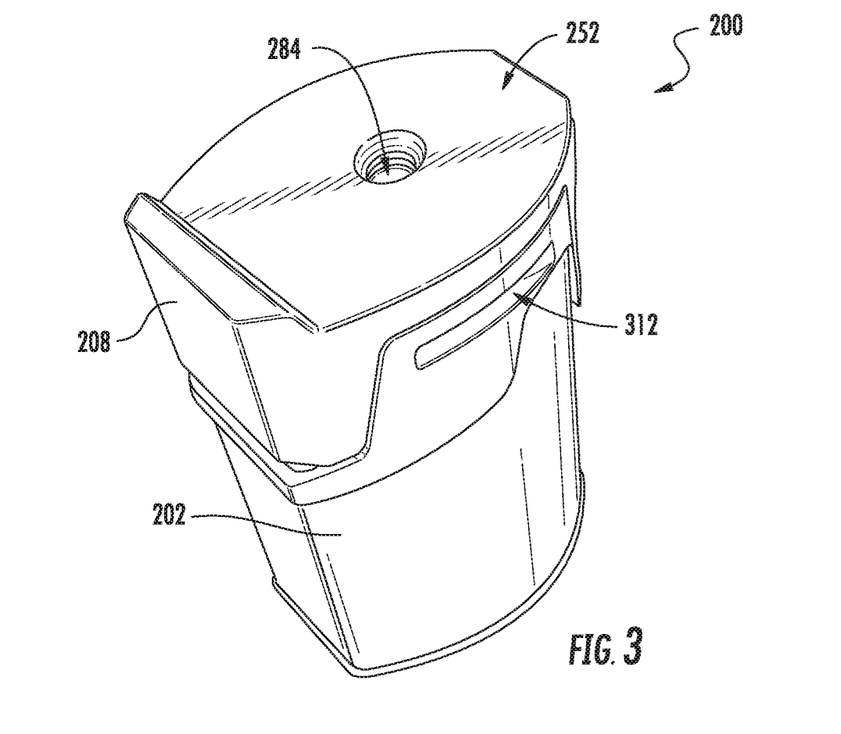
FIG. 3 provides a perspective view of an example brew module for use with the example dispensing assembly of FIG. 2, wherein a lid is shown in a closed position.
Figure 4:
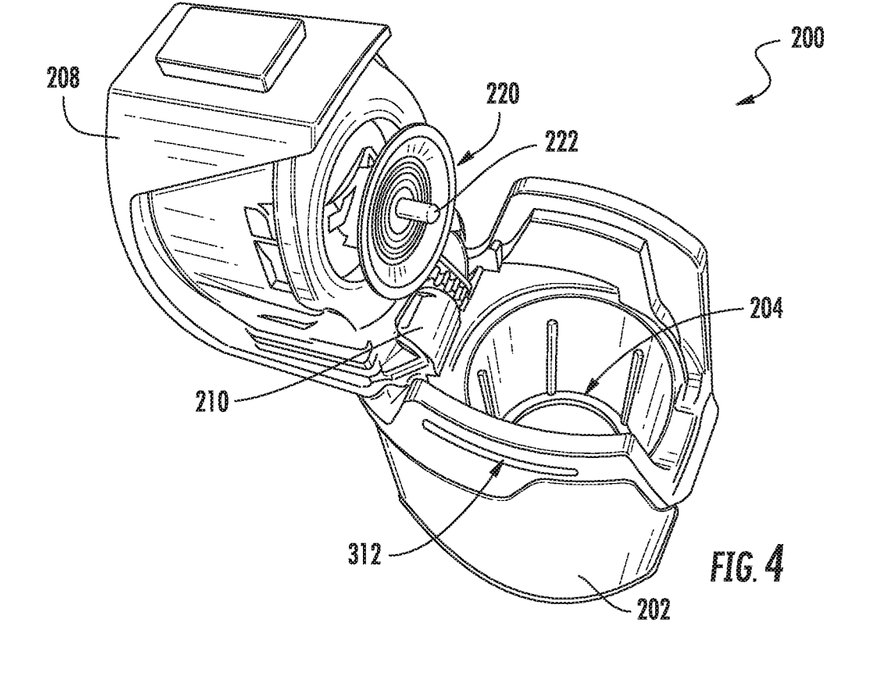
FIG. 4 provides a perspective view of the example brew module for of FIG. 3, wherein the lid is shown in an open position.
Figure 5:
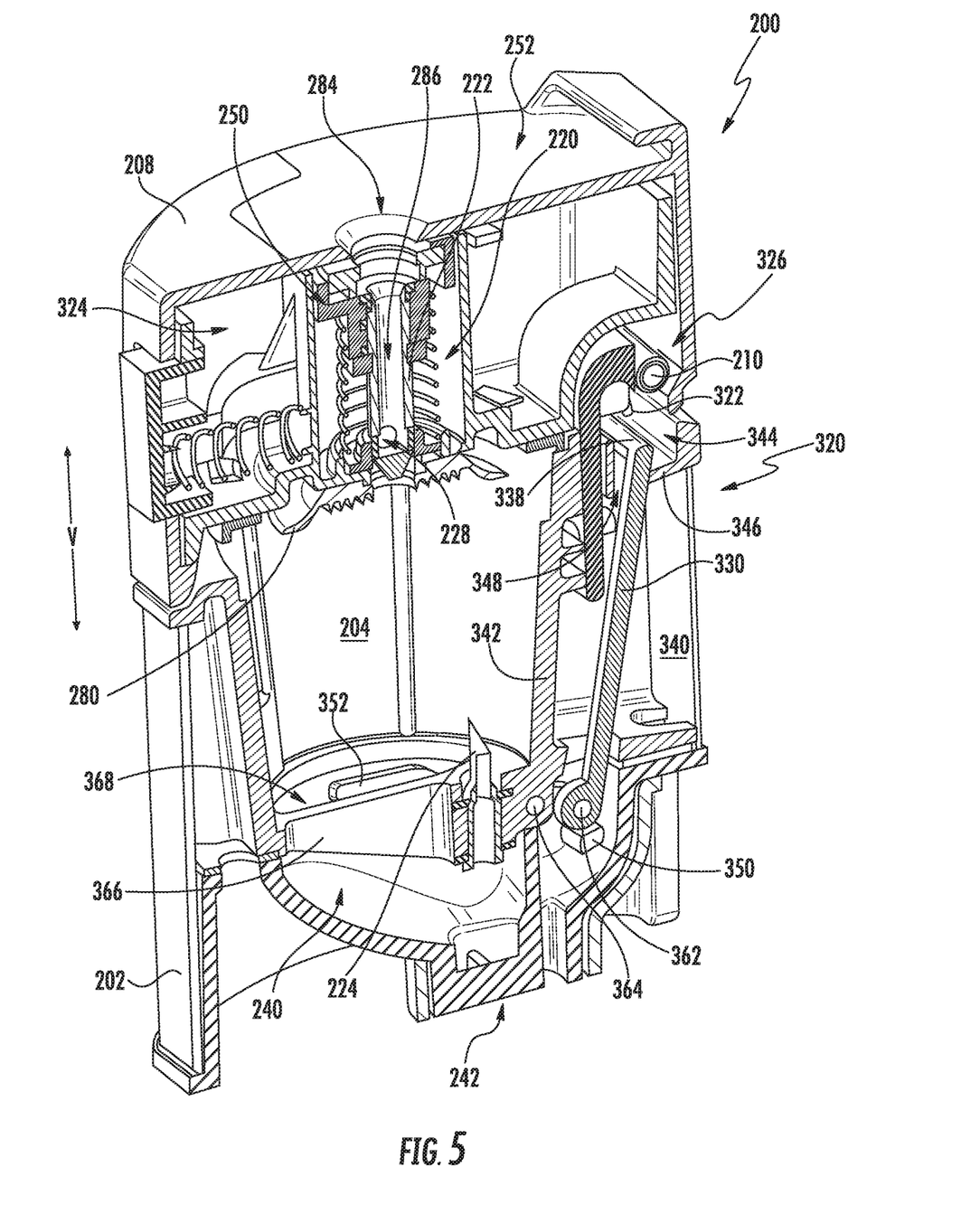
FIG. 5 provides a cut-away, perspective view of the example brew module of FIG. 3, wherein the lid is shown in the closed position.
Figure 6:
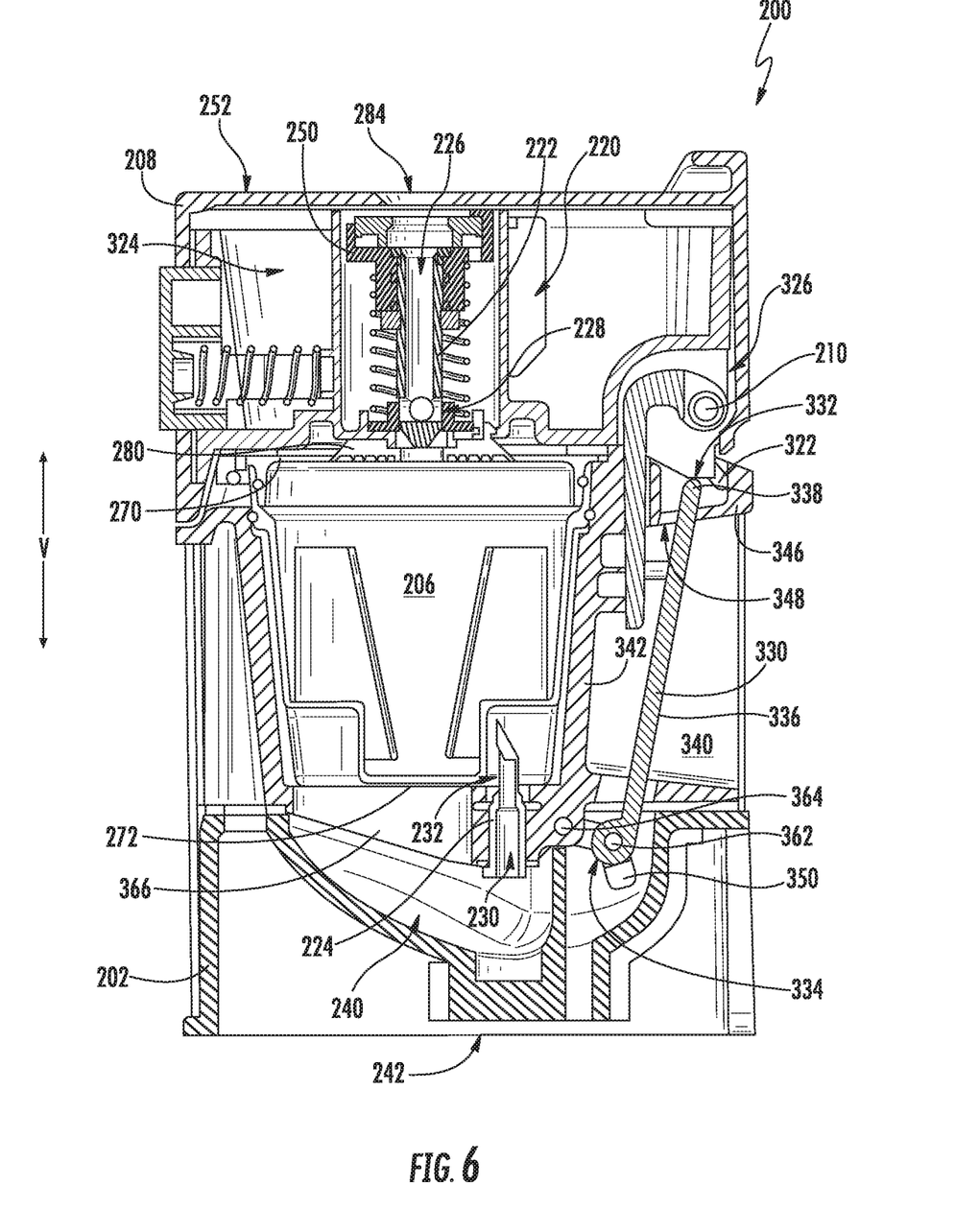
FIG. 6 provides a cross sectional view of the example brew module of FIG. 3, wherein the lid is shown in the closed position.
Figure 7:
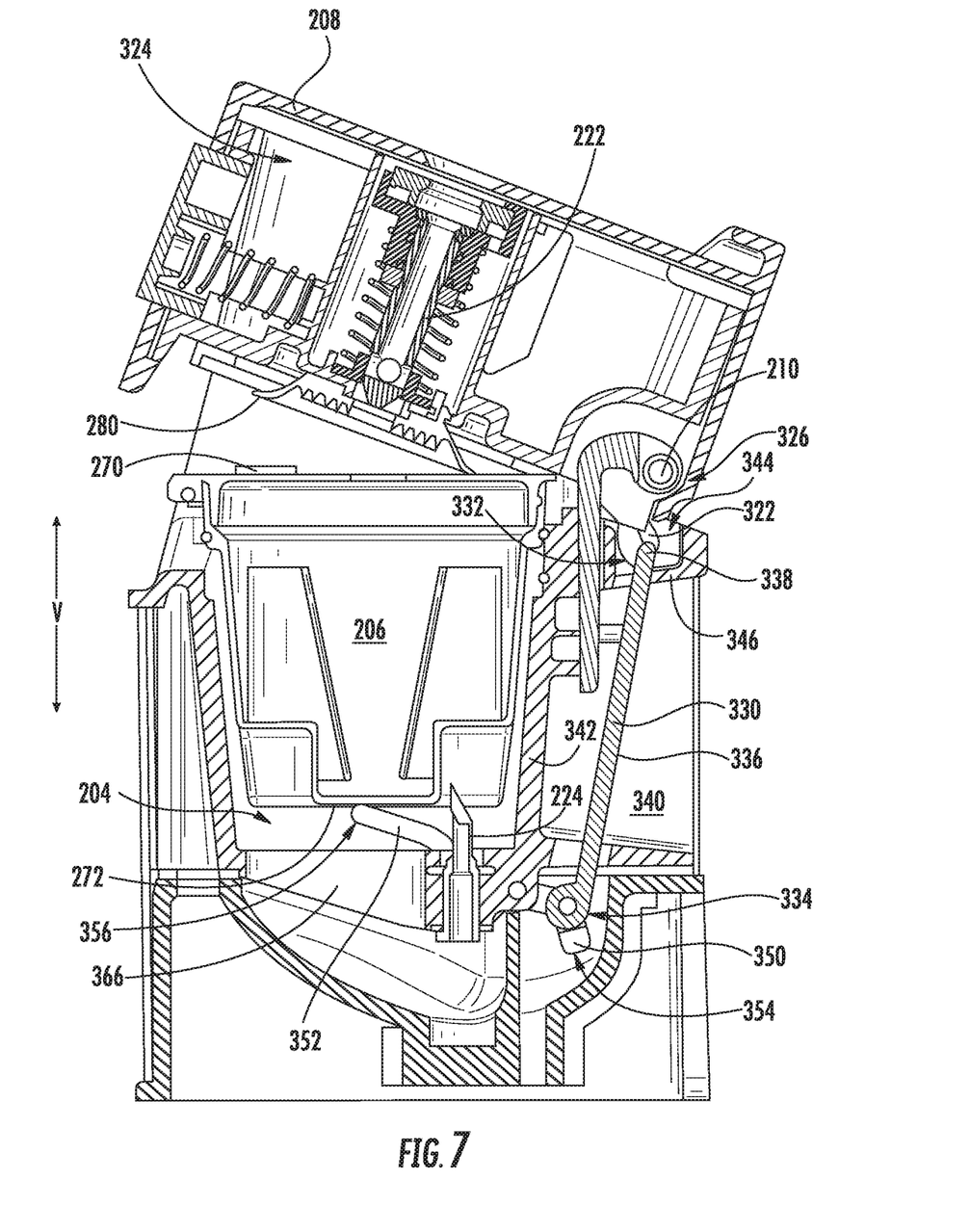
FIG. 7 provides a cross sectional view of the example brew module of FIG. 3, wherein the lid is shown in an intermediate position.
Figure 8:
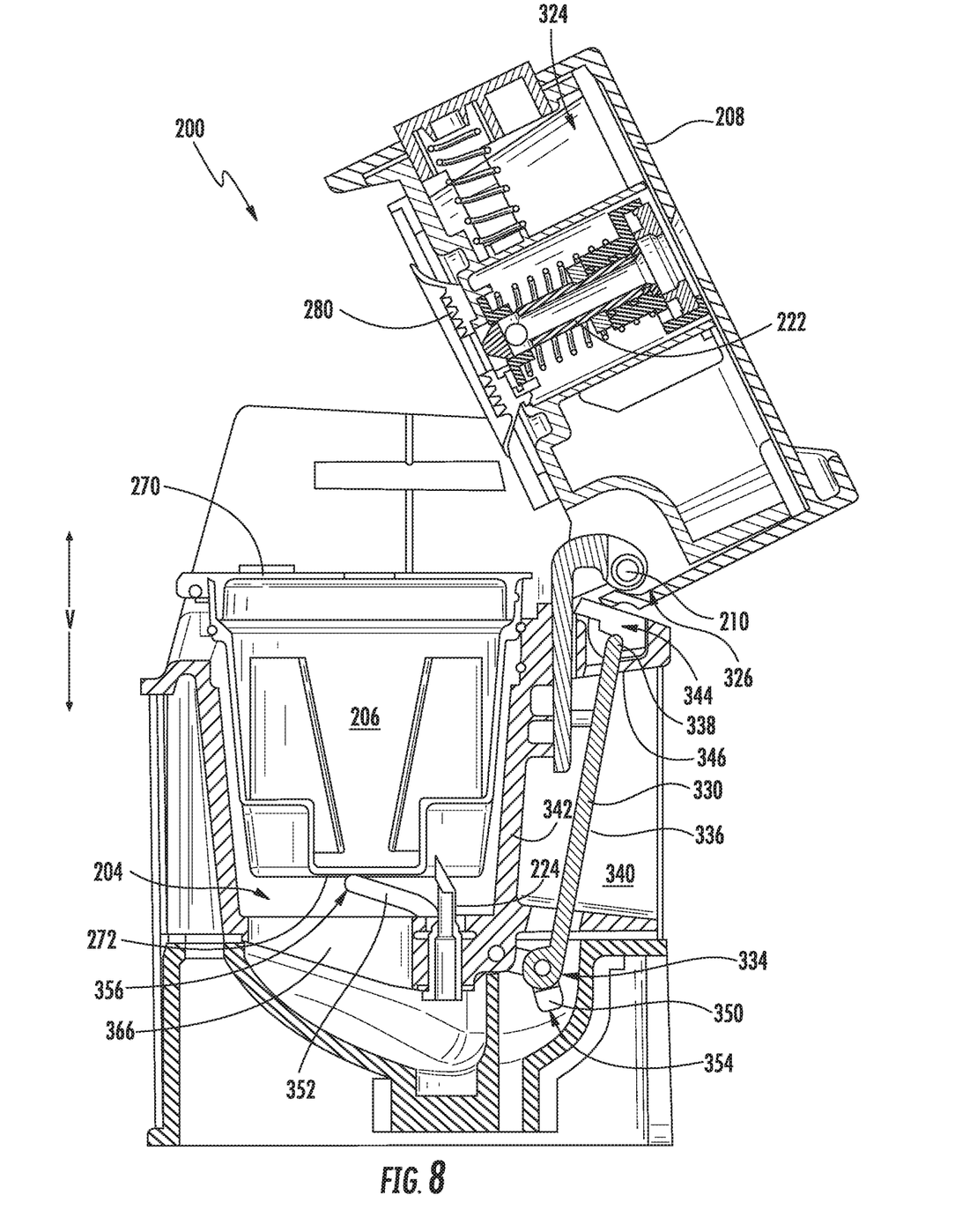
FIG. 8 provides a cross sectional view of the example brew module of FIG. 3, wherein the lid is shown in the open position.

Referring to FIGS. 2, 3, and 11, dispensing assembly 140 includes a brew module 200 according to an example embodiment of the present subject matter. Brew module 200 is mountable within dispenser recess 142 such that brew module 200 is in fluid communication with water delivery tube 170 when mounted within dispenser recess 142. For example, when brew module 200 is installed in dispenser 144, an inlet 284 defined through a lid 208 above a brewing body 202 is in vertical alignment with the water delivery tube 170. Dispenser 144 may be configured for extending water delivery tube 170 downward along the vertical direction V such that water delivery tube 170 is received into inlet 284. During use, heated water from the water heating assembly may flow into brew module 200 via water delivery tube 170 at inlet 284.

Referring now generally to FIGS. 2 through 8, brew module 200 may include a body 202 that defines a brew chamber 204. Brew chamber 204 may be a substantially cylindrical chamber that is configured to receive a brew pod 206, as discussed below. A lid 208 is pivotally attached to body 202 with a hinge 210 to permit selective access to brew chamber 204. More specifically, lid 208 is pivotable between a closed or first position (FIGS. 3, 5, and 6) and an open or second position (FIGS. 4 and 8), as well as one or more intermediate positions (FIG. 7) therebetween.

In optional embodiments, lid 208 includes an outer seal 280 that extends around and forms a seal with a peripheral edge of top cover 270 of brew pod 206 when lid 208 is in the closed position. According to example embodiments, outer seal 280 is a resilient cylindrical gasket that may include one or more ridges for ensuring a proper seal with top cover 270 of brew pod 206. During use, outer seal 280 ensures that heated water supplied into brew pod 206 does not leak into brew chamber 204.

As shown in FIGS. 5 through 8, brew module 200 includes an upper needle assembly 220 that includes an upper needle 222 positioned proximate a top portion of brew chamber 204. In addition, brew module 200 includes a lower needle 224 positioned proximate a bottom portion of brew chamber 204. Needles 222, 224 are each configured for piercing brew pod 206 and may define one or more channels and/or apertures for passing liquid through needles 222, 224. For example, upper needle 222 may define a flow channel 226 and one or more water supply holes 228. Generally, flow channel 226 and water supply holes 228 are configured for supplying heated water from moving water delivery tube 170 (FIG. 11) into brew pod 206 to facilitate the brewing or beverage making process. Similarly, lower needle 224 may define a flow channel 230 and one or more holes 232 through which liquid may pass out of brew pod 206.

As shown, brew module 200 defines an outlet chamber 240 and an outlet 242 through which beverage may be dispensed from brew module 200. Flow channel 230 and holes 232 of lower needle 224 place brew chamber 204 and outlet chamber 240 in fluid communication such that liquids (e.g., a brewed beverage) may drain from brew chamber 204 and flow out of brew module 200. Optionally, brew module 200 may further include a vent positioned within the outlet chamber 240, for example, to prevent a vacuum from being created within outlet chamber 240 and allow liquid to flow smoothly out of outlet 242.

One or both of needles 222, 224 may be generally fixed or stationary relative to brew module 200. In additional or alternative embodiments, upper needle assembly 220 may include one or more features for sliding relative to brewing body 202 and/or lid 208. Features of such a brew module 200 may be embodied by the disclosure of U.S. patent application Ser. No. 15/203,852 (herein incorporated by reference). For example, upper needle 222 may be attached to a drive member 250 which is slidably received within lid 208. More specifically, drive member 250 (and thus upper needle 222) may be configured to move in a vertical direction V between a retracted position and an extended position when installed on dispenser 144, e.g., in response to water delivery tube 170 (FIG. 11). In other words, drive member 250 is configured to move in a direction substantially perpendicular to a top surface 252 of lid 208.

As illustrated, brew pod 206 is generally a container that contains (or is fillable with) a predetermined amount of brewing contents, such as coffee, tea, hot chocolate, lemonade, or the like. The brewing contents are mixed with water to create a beverage that is dispensed to the user. According to some embodiments, brew pod 206 may also include a filter (not shown) positioned within brew pod 206 and configured for filtering brewing contents, such as coffee grounds or tea leaves. Brew pod 206 may be a single-use pod or a reusable pod. A top cover 270 of brew pod 206 may enclose an opening of brew pod 206. Top cover 270 may be pierced, e.g., with upper needle 222. In particular, the top cover 270 may be formed from a suitable foil material, such as aluminum foil, e.g., when brew pod 206 is a single-use pod. Similarly, a bottom 272 of brew pod may be pierced, e.g., with lower needle 224. Brew pod 206 may additionally include a lip 274, which may facilitate placing the brew pod 206 in brew module 200.

During use, once brew pod 206 is received in brew module 200 and brew module 200 is inserted into dispenser 144, moving water delivery tube 170 provides heated water into brew pod 206. The heated water may mix with contents within brew pod 206, and a liquid brewed beverage may then flow from brew module 200 into, for example, a container or cup (not shown) typically placed within dispenser recess 142 below brew module 200.

As best shown in FIGS. 3 and 11, dispensing assembly 140 further includes features for mounting brew module 200 to dispenser 144. For example, dispenser 144 may define a plurality of flanges 310 that extend down from dispenser 144 and toward each other. Body 202 of brew module 200 defines corresponding slots 312 on either side that are configured to receive flanges 310. In this manner, a user may slide brew module 200 into engagement with dispenser and flanges 310 may hold brew module 200 in place while dispensing the brewed beverage. Although a slot/flange arrangement is described herein, one skill in the art will appreciate that any suitable means of mounting brew module 200 to dispenser 144 may be used while remaining within the scope of the present subject matter. For example, dispenser 144 may define a tray that is configured to receive and secure brew module 200. Additionally or alternatively, different slot and flange configurations or other mechanical means of securing brew module 200 to dispenser 144 may be used.

One skilled in the art will appreciate that brew module 200 is used only for the purpose of explaining certain aspects of the present subject matter. Variations and modifications may be made without departing from the scope of the present subject matter. For example, different chamber configurations may be used, alternative needles geometries are possible, and other changes may be made while remaining within the scope of the present subject matter.

Referring now generally to FIGS. 5 through 10, example embodiments of brew module 200 include a pod actuating assembly 320 to motivate brew pod 206 from or within brew chamber 204. As will be described in detail below, pod actuating assembly 320 may correlate movement of lid 208 to movement of brew pod 206. For instance, pod actuating assembly 320 may motivate a brew pod 206 away from brew chamber 204 as lid 208 pivots from the closed position to the open position. In turn, brew pod 206 may be easily accessed and/or removed from (i.e., moved between) brew chamber 204 when lid 208 is in the open position.

Generally, pod actuating assembly 320 includes one or more members engaged with the lid 208 to move therewith. In some such embodiments, lid 208 includes a cam 322. As shown, cam 322 may be formed on a rear portion 326 of lid 208 that is oppositely disposed from a front portion 324 of lid 208. Specifically, rear portion 326 and front portion 324 may be formed on opposite transverse sides of hinge 210. Generally, front portion 324 may house upper needle assembly 220 and extend over brew chamber 204 and/or brew pod 206 in the closed position. As lid 208 is lifted from the closed position to the open position, front portion 324 is pivoted upward away from brew chamber 204. By contrast, rear portion 326 is spaced away from brew chamber 204 in the closed position, e.g., such that rear portion 326 is offset from or not vertically aligned to brew chamber 204. As lid 208 is lifted from the closed position to the open position, rear portion 326 is pivoted downward towards brew chamber 204. In turn, cam 322 is also pivoted downward with rear portion 326.

Figure 9:
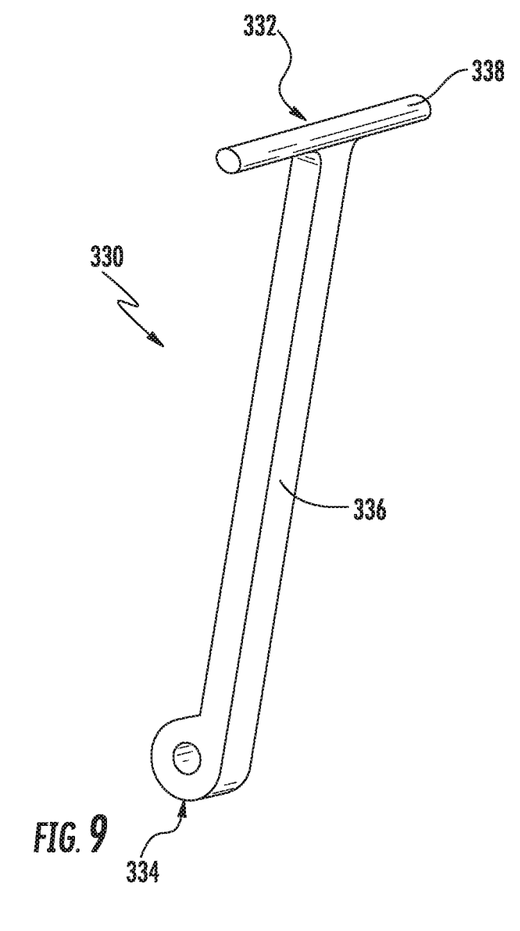
FIG. 9 provides a perspective view of an example actuating lever for use in the example brew module of FIG. 3.

In some embodiments, pod actuating assembly 320 includes an actuating lever 330. As shown, actuating lever 330 extends between a first end 332 and a second end 334. Actuating lever 330 may be a generally rigid member formed, e.g., from an inelastic plastic or metal material, to resist deformation during use. A rigid arm 336 is formed between first end 332 and second end 334. Optionally, first end 332 may include an enlarged follower head 338 that extends, for example, perpendicular to rigid arm 336. In some such embodiments, head 338 may have a generally cylindrical shape to directly engage cam 322.

When assembled, the first end 332 of actuating lever 330 may be positioned to engage a portion of lid 208. For instance, first end 332 may be slidably engaged with cam 322 at follower head 338. As lid 208 rotates between the closed position and the open position, follower head 338 may slide along cam 322. Specifically, follower head 338 may selectively contact cam 322 between the closed position and the open position. Engagement or contact between follower head 338 and cam 322 may thus motivate actuating lever 330, including rigid arm 336 and second end 334, to translate along the path of cam 322.

In example embodiments, actuating lever 330 is positioned within brewing body 202. For instance, brewing body 202 may define a lever chamber 340 that encloses at least a portion of actuating lever 330, including, for instance, rigid arm 336. The actuating lever 330 is movably disposed within the lever chamber 340. Moreover, during use, lever chamber 340 is generally in fluid isolation from brew chamber 204. Specifically, lever chamber 340 is separated from the flow path for liquid through brew chamber 204. Thus, liquids passed to or through the needles 222, 224 will not pass to lever chamber 340. An internal wall 342 may separate brew chamber 204 and lever chamber 340. When brew pod 206 is disposed within brew chamber 204, internal wall 342 may guide or hold a portion of brew pod 206.

Optionally, a head chamber 344 may be further defined within brewing body 202. In some such embodiments, an interior lip 346 extends below follower head 338 to generally hold or guide follower head 338, e.g., along the path of cam 322. As shown, follower head 338 may be positioned between interior lip 346 and cam 322 such that rotation of cam 322 selectively contacts and motivates follower head 338. A lip aperture 348 is defined through lip, e.g., to permit the passage of rigid arm 336. Thus, rigid arm 336 may extend from first end 332 within head chamber 344 and through lip aperture 348 to second end 334.

Figure 10:
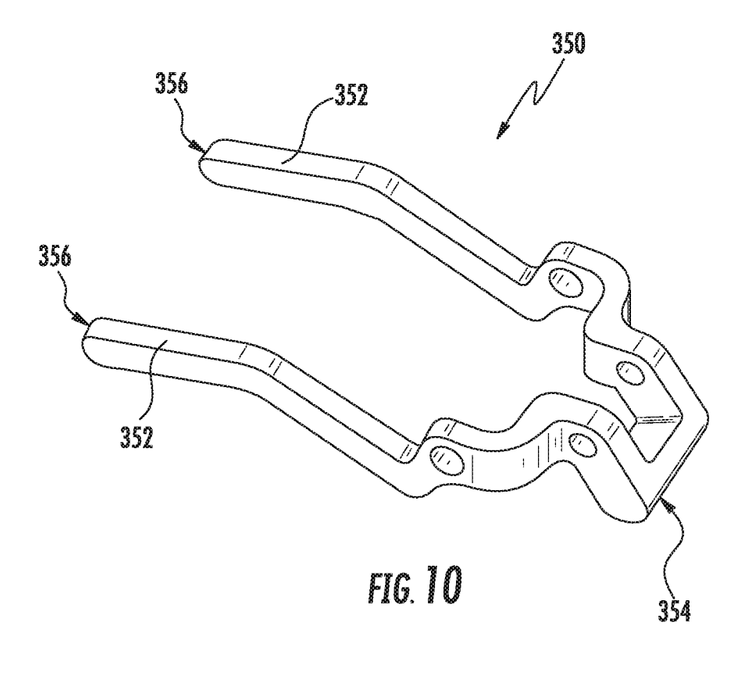
FIG. 10 provides a perspective view of an example lift frame for use in the example brew module of FIG. 3.

In certain embodiments, pod actuating assembly 320 includes a lift frame 350 to selectively engage brew pod 206. As shown, lift frame 350 may include a pair of discrete arms 352 fixed relative to each other to rotate into contact with brew pod 206, e.g., between the closed position and the open position. In some such embodiments, the arms 352 extend in parallel from a drive end 354 to an engagement end 356. When assembled, lift frame 350 may be connected with actuating lever 330. Specifically, the second end 334 of actuating lever 330 may pivotally attach to a portion of lift frame 350. A first pin 362 may join the lift frame 350 to the actuating lever 330, e.g., at the drive end 354 of lift frame 350. A second pin 364 may be fixed within the brewing body 202 and pivotally attach another portion of lift frame 350 to brewing body 202. For instance, a fixed brace 366 within brewing body 202 may hold second pin 364 and support lift frame 350 at a location between the drive end 354 and the engagement end 356. Fixed brace 366 may be formed with or generally stationary relative to body 202. During use, second pin 364 may act as a fulcrum on which lift frame 350 may pivot while the second end 334 of actuating lever 330 pivotally translates about first pin 362 at the drive end 354 of lift frame 350.

As shown, fixed brace 366 may extend below brew chamber 204. At least a portion of lower needle 224 may extend through or from brace 366, e.g., in fixed attachment thereto. When brew pod 206 is held within brew chamber 204, e.g., in the closed position, brace 366 may generally support brew pod 206. In some such embodiments, each arm 352 of lift frame 252 is positioned on opposite sides of fixed brace 366. In turn, lower needle 224 is positioned between the pair of arms 352. Openings 368 are defined on opposite sides of fixed brace 366 through which the engagement ends 356 of arms 352 may respectively travel. Thus, engagement end(s) 356 of lift frame 350 may pass into the brew chamber 204 below the brew pod 206. As lift frame 350 rotates from the closed position to the open position, arms 252 will contact brew module 200 (e.g., at bottom portion 272) and further propel or elevate the brew pod 206 upward from brew chamber 204. Advantageously, a user may easily access the elevated brew pod 206. In some such embodiments, lift frame 350 is generally contained within the brewing body 202 and advantageously hidden from a user. During use, accidental engagement with the lift pod actuating assembly 320 may be prevented.

The movement of lift frame 350 may break the seal or interference fit formed between the brew pod 206 and the lower needle 224. Optionally, lift frame 350 may raise the bottom portion 272 of brew pod 206 above lower needle 224, thereby preventing lower needle 224 from passing back into brew pod 206.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A beverage dispensing assembly for use with an appliance, the beverage dispensing assembly comprising:
    a brewing body defining a brew chamber to receive a brew pod, the brewing body defining an outlet;
    a lid pivotally attached to the brewing body to rotate between a first position and a second position, the first position restricting access to the brew chamber, the second position permitting movement of the brew pod between the brew chamber, the lid comprising a cam and defining an inlet to receive a flow of water in the first position;
    an actuating lever extending between a first end and a second end, the first end being slidably engaged with the cam to move between the first position and the second position;
    a lift frame extending within the brew chamber and spaced apart from the lid, the lift frame pivotally attached to the lever at the second end to selectively motivate the brew pod away from the brew chamber and separately from the lid in the second position;
    a first pin joining the lift frame to the actuating lever at the second end; and
    a second pin fixed to the brewing body, wherein the lift frame is pivotally attached to the second pin.

2. The beverage dispensing assembly of claim 1, further comprising a lower needle disposed within the brew chamber.

3. The beverage dispensing assembly of claim 2, wherein the lift frame comprises a pair of arms to engage the brew pod, and wherein the lower needle is disposed between the pair of arms.

4. The beverage dispensing assembly of claim 2, wherein the lower needle defines a flow channel fixed within the brew chamber.

5. The beverage dispensing assembly of claim 1, wherein the actuating lever comprises an enlarged follower head formed at the first end, and wherein the brewing body defines a head chamber holding the follower head therein in selective contact with the cam.

6. The beverage dispensing assembly of claim 1, further comprising an upper needle attached to the lid in fluid communication with the inlet.

7. The beverage dispensing assembly of claim 1, further comprising an upper seal attached to the lid to seal the brew pod in the first position.

8. The beverage dispensing assembly of claim 1, wherein the brewing body defines a lever chamber in fluid isolation from the brew chamber, and wherein the actuating lever is movably disposed within the lever chamber.

9. An appliance defining a vertical direction, the appliance comprising:
    a cabinet defining an internal chamber;
    a door being rotatably hinged to the cabinet to provide selective access to the internal chamber, the door defining a dispenser recess;
    a dispensing assembly positioned within the dispenser recess and comprising a water delivery tube extending along the vertical direction; and
    a brew module being removably mounted to the dispensing assembly, the brew module comprising
        a brewing body defining a brew chamber to receive a brew pod, the brewing body defining an outlet,
        a lid pivotally attached to the brewing body to rotate between a first position and a second position, the first position restricting access to the brew chamber, the second position permitting movement of the brew pod between the brew chamber, the lid comprising a cam and defining an inlet to receive a flow of water in the first position,
        an actuating lever extending between a first end and a second end, the first end being slidably engaged with the cam to move between the first position and the second position, a lift frame extending within the brew chamber and spaced apart from the lid, the lift frame pivotally attached to the lever at the second end to selectively motivate the brew pod away from the brew chamber and separately from the lid in the second position, a first pin joining the lift frame to the actuating lever at the second end, and a second pin fixed to the brewing body, wherein the lift frame is pivotally attached to the second pin.

10. The appliance of claim 9, further comprising a lower needle disposed within the brew chamber.

11. The appliance of claim 10, wherein the lift frame comprises a pair of arms to engage the brew pod, and wherein the lower needle is disposed between the pair of arms.

12. The appliance of claim 10, wherein the lower needle defines a flow channel fixed within the brew chamber.

13. The appliance of claim 9, wherein the actuating lever comprises an enlarged follower head formed at the first end, and wherein the brewing body defines a head chamber holding the follower head therein in selective contact with the cam.

14. The appliance of claim 9, further comprising an upper needle attached to the lid in fluid communication with the inlet.

15. The appliance of claim 9, wherein the appliance is a refrigerator appliance.

16. The appliance of claim 9, wherein the brewing body defines a lever chamber in fluid isolation from the brew chamber, and wherein the actuating lever is movably disposed within the lever chamber.

\* \* \* \* \*